(12) United States Patent
Yoakum

(10) Patent No.: US 9,485,632 B2
(45) Date of Patent: Nov. 1, 2016

(54) ACTIVITY-AWARE INTELLIGENT ALERTING AND DELIVERY OF ELECTRONIC SHORT MESSAGES, AND RELATED METHODS, APPARATUSES, AND COMPUTER-READABLE MEDIA

(71) Applicant: Avaya Inc., Santa Clara, CA (US)

(72) Inventor: John H. Yoakum, Cary, NC (US)

(73) Assignee: Avaya Inc., Basking Ridge, NJ (US)

( * ) Notice: Subject to any disclaimer, the term of this patent is extended or adjusted under 35 U.S.C. 154(b) by 67 days.

(21) Appl. No.: 13/683,127

(22) Filed: Nov. 21, 2012

(65) Prior Publication Data

US 2014/0141818 A1    May 22, 2014

(51) Int. Cl.
*H04W 4/14* (2009.01)
*H04L 12/58* (2006.01)
*H04L 12/18* (2006.01)

(52) U.S. Cl.
CPC ............. *H04W 4/14* (2013.01); *H04L 51/26* (2013.01); *H04L 12/1895* (2013.01)

(58) Field of Classification Search
CPC . H04L 51/12; H04L 12/5895; H04L 12/585; H04L 51/043; H04L 51/24; H04L 51/26; H04L 51/04; H04L 51/14; H04W 4/12; H04W 52/0251; H04W 52/0258; H04W 4/14; H04W 68/005
USPC ........................................................ 455/466
See application file for complete search history.

(56) References Cited

U.S. PATENT DOCUMENTS

| 6,732,273 | B1 | 5/2004 | Byers |
| 7,617,042 | B2 | 11/2009 | Horvitz et al. |
| 2007/0004385 | A1* | 1/2007 | Horvitz et al. ............ 455/414.1 |
| 2009/0117922 | A1 | 5/2009 | Bell et al. |
| 2010/0260326 | A1 | 10/2010 | Michaelis et al. |
| 2011/0021178 | A1 | 1/2011 | Balasaygun et al. |
| 2013/0295973 | A1* | 11/2013 | Kumaran et al. ............. 455/466 |

OTHER PUBLICATIONS

Dabbish et al., "Coordinating Communication: Awareness Displays and Interruption," Short Talk: Collaborative Systems, Apr. 2003, pp. 786-787, CHI, Fort Lauderdale, Florida.
De Choudhury et al., "Context Aware Routing of Enterprise User Communications," Fifth Annual IEEE International Conference on Pervasive Computing and Communications Workshops, Mar. 2007, pp. 39-44, White Plains, New York.
Jachner et al., "Rich Presence: A New User Communications Experience," Technology White Paper, Alcatel Telecommunications Review, 1st Quarter, 2005, 8 pages.

* cited by examiner

*Primary Examiner* — Nam Huynh
(74) *Attorney, Agent, or Firm* — Sheridan Ross P.C.

(57) ABSTRACT

Activity-aware intelligent alerting and delivery of electronic short messages, and related methods, apparatuses, and computer-readable media are also disclosed. In one embodiment, a method for providing intelligent alerting and delivery of an electronic short message comprises receiving an electronic short message directed to a recipient device of a recipient and originating from a sender device of a sender, and determining an interruption indicator that indicates a recipient activity priority relative to a delivery priority of the electronic short message. The method also comprises automatically generating one or more alerting parameters and one or more delivery parameters based on the interruption indicator, and delivering the electronic short message to the recipient device based on the one or more alerting parameters and the one or more delivery parameters. In this manner, unnecessary interruption of the recipient may be minimized while assuring timely delivery of important electronic short messages.

12 Claims, 10 Drawing Sheets

ACTIVITY-AWARE INTELLIGENT ALERTING AND DELIVERY OF ELECTRONIC SHORT MESSAGES, AND RELATED METHODS, APPARATUSES, AND COMPUTER-READABLE MEDIA

BACKGROUND

1. Field of the Disclosure

The technology of the disclosure relates generally to alerting and delivery of inbound electronic short messages.

2. Technical Background

Conventional electronic short messaging systems, such as Short Message Service (SMS), Multimedia Messaging Service (MMS), and Instant Messaging (IM), enable interactive communications between users based on an "immediate delivery" system. In the immediate delivery system, an electronic short message from a sender is delivered to an intended recipient's messaging device as soon as the messaging system determines that the recipient is available (e.g., by detecting that the recipient's messaging device is in communication with the messaging system). This system contrasts with typical email systems, which asynchronously buffer and deliver electronic communications according to a store-and-forward paradigm.

Some electronic short messaging systems provide a sender with insight into an intended recipient's status, such as an indicator of a presence, a location, and/or an availability of the intended recipient's messaging device. However, most electronic short messaging systems permit the sender to disregard such indicators when deciding to send an electronic short message to the recipient. Because the electronic short message is delivered as soon as the recipient is determined to be available and may be accompanied by a delivery alert, it is interruptive by its very nature. Some interruptive messages may be valuable in certain circumstances, but many electronic short messages do not warrant the immediate attention of the recipient. Moreover, the delivery of an inbound electronic short message and an accompanying alert may create a distraction that at best interrupts an activity or thought process of the recipient, and at worst causes embarrassment or aggravation to the recipient.

SUMMARY OF THE DETAILED DESCRIPTION

Embodiments of the disclosure provide activity-aware intelligent alerting and delivery of electronic short messages. Related methods, apparatuses, and computer-readable media are also disclosed. As used herein, an electronic short message is a text, image, or audiovisual interactive electronic communication, delivery of which is contingent upon an availability of a recipient. An electronic short message typically has a significantly smaller maximum size relative to a maximum size of a conventional email and/or a conventional email attachment. In this regard, in one embodiment, a method for providing intelligent alerting and delivery of an electronic short message is provided. The method comprises receiving, by a computing device, an electronic short message directed to a recipient device of a recipient and originating from a sender device of a sender. The method further comprises determining, by the computing device, an interruption indicator that indicates a recipient activity priority relative to a delivery priority of the electronic short message. The method also comprises automatically generating, by the computing device, one or more alerting parameters based on the interruption indicator and one or more delivery parameters based on the interruption indicator. The method further comprises delivering the electronic short message to the recipient device based on the one or more alerting parameters and the one or more delivery parameters. In this manner, unnecessary interruption of the recipient may be minimized while assuring timely delivery of important electronic short messages and appropriate handling of all electronic short messages.

In another embodiment, a system for providing intelligent alerting and delivery of an electronic short message is provided. The system comprises at least one communications interface and an intelligent message delivery agent associated with the at least one communications interface. The intelligent message delivery agent is configured to receive an electronic short message directed to a recipient device of a recipient and originating from a sender device of a sender. The intelligent message delivery agent is further configured to determine an interruption indicator that indicates a recipient activity priority relative to a delivery priority of the electronic short message. The intelligent message delivery agent is also configured to automatically generate one or more alerting parameters based on the interruption indicator and one or more delivery parameters based on the interruption indicator. The intelligent message delivery agent is further configured to deliver the electronic short message to the recipient device based on the one or more alerting parameters and the one or more delivery parameters.

In another embodiment, a non-transitory computer-readable medium is provided. The non-transitory computer-readable medium has stored thereon computer-executable instructions to cause a processor to implement a method comprising receiving, by a computing device, an electronic short message directed to a recipient device of a recipient and originating from a sender device of a sender. The method implemented by the computer-executable instructions further comprises determining, by the computing device, an interruption indicator that indicates a recipient activity priority relative to a delivery priority of the electronic short message. The method implemented by the computer-executable instructions also comprises automatically generating, by the computing device, one or more alerting parameters based on the interruption indicator and one or more delivery parameters based on the interruption indicator. The method implemented by the computer-executable instructions further comprises delivering the electronic short message to the recipient device based on the one or more alerting parameters and the one or more delivery parameters.

Additional features and advantages will be set forth in the detailed description, claims, and appended drawings that follow, and, in part, will be readily apparent to those skilled in the art or recognized by practicing the embodiments as described herein. It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

The accompanying drawing figures incorporated in and forming a part of this specification illustrate several aspects of the disclosure, and together with the description serve to explain the principles of the disclosure.

DETAILED DESCRIPTION

Figure 1:
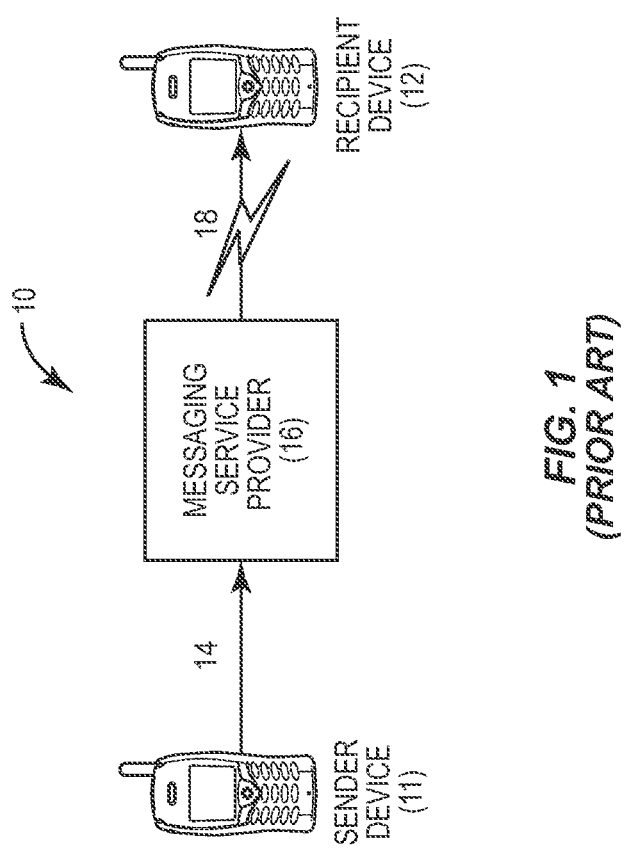
FIG. 1 is a block diagram illustrating a conventional electronic short message delivery system.

With reference now to the drawing figures, several exemplary embodiments of the present disclosure are described. The word "exemplary" is used herein to mean "serving as a non-limiting example, instance, or illustration." It is to be understood that any embodiment described herein as "exemplary" is not necessarily to be construed as preferred or advantageous over other embodiments. It is to be further understood that examples enumerated herein are not to be construed as limiting in any way.

Embodiments of the disclosure provide activity-aware intelligent alerting and delivery of electronic short messages. Related methods, apparatuses, and computer-readable media are also disclosed. In this regard, in one embodiment, a method for providing intelligent alerting and delivery of an electronic short message is provided. The method comprises receiving, by a computing device, an electronic short message directed to a recipient device of a recipient and originating from a sender device of a sender. The method further comprises determining, by the computing device, an interruption indicator that indicates a recipient activity priority relative to a delivery priority of the electronic short message. The method also comprises automatically generating, by the computing device, one or more alerting parameters based on the interruption indicator and one or more delivery parameters based on the interruption indicator. The method further comprises delivering the electronic short message to the recipient device based on the one or more alerting parameters and the one or more delivery parameters.

Before examples of methods, apparatuses, and computer-readable media for activity-aware intelligent alerting and delivery of electronic short messages are discussed, a conventional electronic short message delivery system is described and contrasted with an exemplary system for activity-aware intelligent alerting and delivery as disclosed herein. In this regard, FIGS. 1 and 2 illustrate a conventional electronic short message delivery system and an exemplary activity-aware intelligent alerting and delivery system, respectively.

Figure 2:
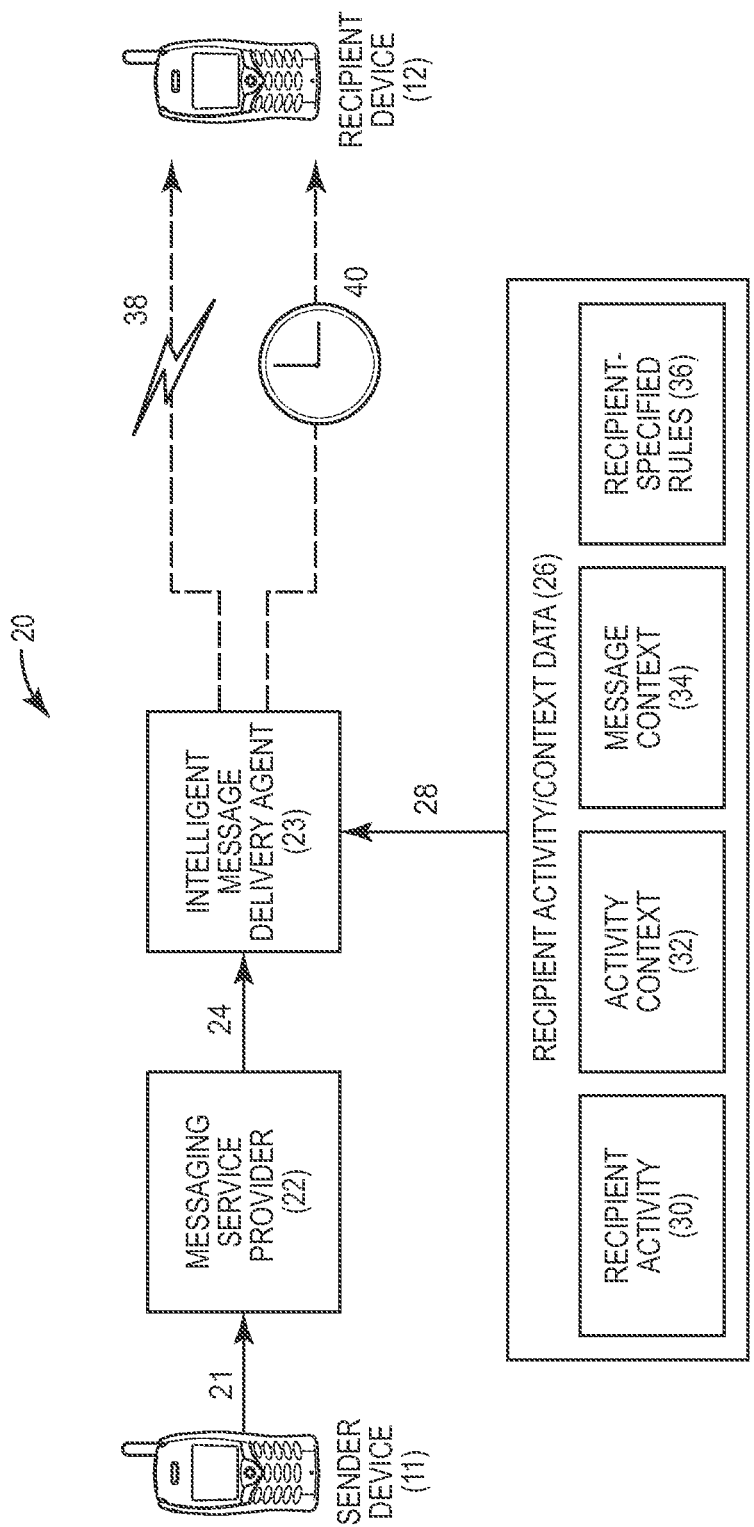
FIG. 2 is a block diagram of a system for activity-aware intelligent alerting and delivery of electronic short messages, provided to contrast with the conventional electronic short message delivery system of FIG. 1.

In the exemplary system 10 of FIG. 1, a sender device 11 of a sender (not shown) and a recipient device 12 of a recipient (not shown) represent telecommunications devices that are each capable of sending and receiving electronic short messages. In some embodiments, an electronic short message may be a Short Message Service (SMS) message, a Multimedia Messaging Service (MMS) message, an Instant Messaging (IM) message, and/or another immediate-delivery interactive electronic communication, delivery of which is contingent upon an availability of the recipient. The sender device 11 and/or the recipient device 12 may be a cellular phone, smartphone, tablet, or other telecommunications device capable of executing a messaging client, or may be a desktop or laptop computer on which a messaging client is running.

As indicated by arrow 14, the sender device 11 transmits an electronic short message directed to the recipient device 12 to a messaging service provider 16. As used herein, "directed to" means that an identifier of the recipient device 12 and/or an identifier of the recipient that is associated with the recipient device 12 is specified by the sender, the sender device 11, and/or the electronic short message. The messaging service provider 16 may include an SMS service provider, an MMS service provider, and/or an IM service provider. It is to be understood that the messaging service provider 16 may represent a messaging service provider with which both the sender device 11 and the recipient device 12 communicate. In some embodiments, the messaging service provider 16 may collectively represent first and second messaging service providers with which the sender device 11 and the recipient device 12 respectively communicate, and which are able to relay electronic short messages to and from each other. Some embodiments may provide that the message service provider 16 may be operative to facilitate a direct transmission of electronic short messages between the sender device 11 and the recipient device 12.

In the conventional electronic short message delivery system 10 illustrated in FIG. 1, the messaging service provider 16 immediately transmits the electronic short message to the recipient device 12, as indicated by combined arrow and lightning bolt 18. In other words, the electronic short message is transmitted to the recipient device 12 as soon as the messaging service provider 16 determines that the recipient device 12 is available for communication, regardless of what activity the recipient is currently, or will soon be, engaged in. This immediate sending may result in the electronic short message arriving at an inopportune time for the recipient, and as a result may cause distraction, embarrassment, or aggravation on the part of the recipient.

In contrast, FIG. 2 illustrates an exemplary activity-aware intelligent alerting and delivery system 20 as disclosed herein. As indicated by arrow 21, the sender device 11 in this example transmits an electronic short message directed to the recipient device 12 to a messaging service provider 22. As noted above, "directed to" as used herein means that an identifier of the recipient device 12 and/or an identifier of the recipient that is associated with the recipient device 12 is specified by the sender, the sender device 11, and/or the electronic short message. Like the messaging service provider 16 of FIG. 1, the messaging service provider 22 may include an SMS service provider, an MMS service provider, and/or an IM service provider. It is to be understood that the messaging service provider 22 may represent a messaging service provider with which both the sender device 11 and the recipient device 12 communicate. In some embodiments, the messaging service provider 22 may collectively represent first and second messaging service providers with which the sender device 11 and the recipient device 12 respectively communicate, and which are able to relay electronic short messages to and from each other. Some embodiments may provide that the message service provider 22 may be operative to facilitate a direct transmission of electronic short messages between the sender device 11 and the recipient device 12.

In this example, instead of immediately transmitting the electronic short message to the recipient device 12 (as done by the messaging service provider 16 of FIG. 1), the messaging service provider 22 transmits the electronic short message to an intelligent message delivery agent 23, as indicated by arrow 24. In some embodiments, the intelligent message delivery agent 23 may comprise a standalone system, while some embodiments may provide that the intelligent message delivery agent 23 comprises elements incorporated into the messaging service provider 22, the sender device 11, and/or the recipient device 12.

The intelligent message delivery agent 23 then receives and analyzes recipient activity/context data 26, as indicated by arrow 28, in order to detect indicia representing the recipient's activity, and to determine a recipient activity priority and/or a delivery priority for the electronic short message. The recipient activity/context data 26 provided to the intelligent message delivery agent 23 may include indicia such as recipient activity data 30, activity context 32, message context 34, and/or optional recipient-specified rules 36. As used herein, "context" refers to additional data or metadata regarding the recipient's activity or the electronic short message that may allow a recipient activity priority and/or a delivery priority of the electronic short message to be assessed.

Based on an analysis of the recipient activity/context data 26, the intelligent message delivery agent 23 may determine whether the detected indicia indicate that an activity in which the recipient is currently engaged, or soon to be engaged, should be prioritized over an immediate delivery of the electronic short message. If not (i.e., if the recipient's activity may be interrupted), then the electronic short message is delivered immediately to the recipient device 12, as indicated by combined arrow and lightning bolt 38. Alternatively, if the recipient's activity should be prioritized over an immediate delivery of the electronic short message, then the intelligent message delivery agent 23 may delay delivery of the electronic short message, as indicated by combined arrow and clock 40. In determining an appropriate delay for delivery, the intelligent message delivery agent 23 may consider an activity in which the recipient is soon to be engaged, and may deliver the electronic short message at a time where the context of the electronic short message is determined to be more consistent with the context of the activity of the recipient. In this manner, the intelligent message delivery agent 23 may automatically minimize any unnecessary interruption of the recipient while assuring timely delivery of important electronic short messages and appropriate handling of all electronic short messages.

Figure 3:
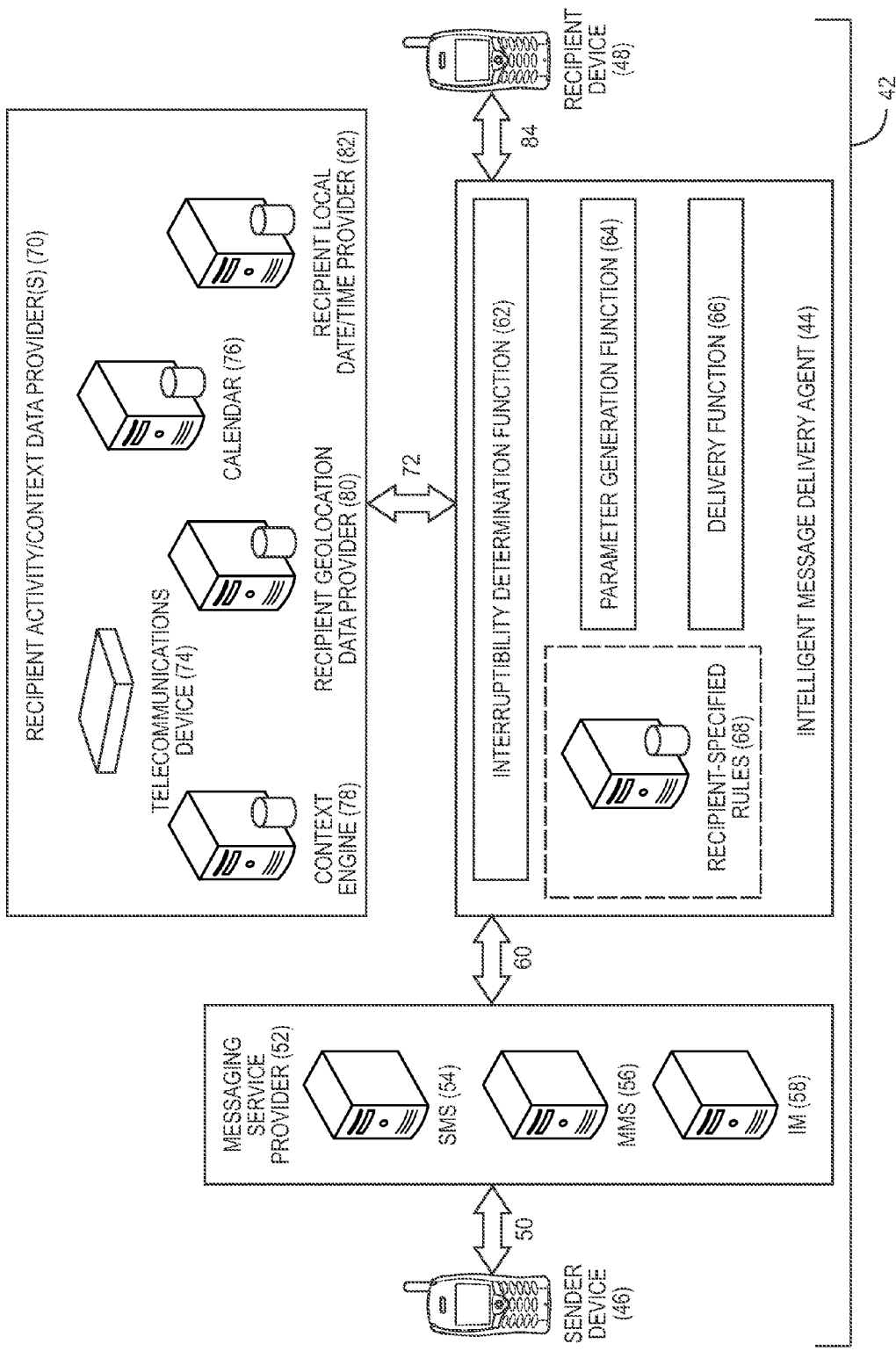
FIG. 3 is a block diagram of an exemplary system that includes an intelligent message delivery agent configured to provide activity-aware alerting and delivery of electronic short messages.

An exemplary system 42, including an intelligent message delivery agent 44 configured to provide activity-aware intelligent alerting and delivery of electronic short messages, is illustrated in FIG. 3. A sender device 46 of a sender (not shown) and a recipient device 48 of a recipient (not shown) represent telecommunications devices that are capable of sending and receiving electronic short messages.

In some embodiments, the sender device 46 and/or the recipient device 48 may be a cellular phone, smartphone, tablet, or other telecommunications device capable of executing a messaging client, such as an SMS, MMS, or IM messaging application. Some embodiments may provide that the sender device 46 and/or the recipient device 48 may be a desktop or laptop computer on which a messaging client is running.

The sender device 46 is communicatively coupled via a communications link 50 to a messaging service provider 52. The messaging service provider 52 is operative to receive an outbound electronic short message originating from the sender device 46 and transmit an inbound electronic short message directed to the recipient device 48 to the intelligent message delivery agent 44. The messaging service provider 52 may comprise an SMS service provider 54, an MMS service provider 56, and/or an IM service provider 58. It is to be understood that the messaging service provider 52 may represent a messaging service provider with which both the sender device 46 and the recipient device 48 communicate. In some embodiments, the messaging service provider 52 may collectively represent first and second messaging service providers with which the sender device 46 and the recipient device 48 respectively communicate, and which are able to relay electronic short messages to and from each other. Some embodiments may provide that the message service provider 52 may be operative to facilitate a direct transmission of electronic short messages between the sender device 46 and the recipient device 48.

The intelligent message delivery agent 44 is provided to intelligently alert and deliver an electronic short message based upon an awareness of a current or future activity of the recipient, and the interruptibility of the recipient's activity. The intelligent message delivery agent 44 is communicatively coupled to the messaging service provider 52 via a communications link 60, such that incoming electronic short messages directed to the recipient device 48 are received by the intelligent message delivery agent 44. The intelligent message delivery agent 44 provides an interruptibility determination function 62, a parameter generation function 64, a delivery function 66, and optional recipient-specified rules 68. The functionality of each of these elements is described in more detail below with respect to FIGS. 5A and 5B and FIGS. 6A-6C.

The intelligent message delivery agent 44 is also communicatively coupled to one or more recipient activity/context data providers 70 via a communications link 72. The recipient activity/context data providers 70 may generate, store, and/or provide data enabling the intelligent message delivery agent 44 to detect indicia representing activities in which the recipient is currently engaged or soon will be engaged, as well as other contextual information regarding the recipient's activities. Exemplary recipient activity/context data providers 70 may include a telecommunications device 74, a calendar 76, a context engine 78, a recipient geolocation data provider 80, and/or a recipient local date/time provider 82. The operation of the recipient activity/context data providers 70 and their interaction with the intelligent message delivery agent 44 are discussed in greater detail below with respect to FIGS. 5A and 5B and FIGS. 6A-6C.

The intelligent message delivery agent 44 is further communicatively coupled to the recipient device 48 via a communications link 84. Through the communications link 84, the intelligent message delivery agent 44 may provide intelligent alerting and delivery of electronic short messages to the recipient device 48. The intelligent message delivery agent 44 may also receive data from the recipient device 48, such as data related to usage of the recipient device 48, usage of a messaging client or other software application, network connectivity, motion sensing, and/or audio/image/video input and recognition.

Figure 4:
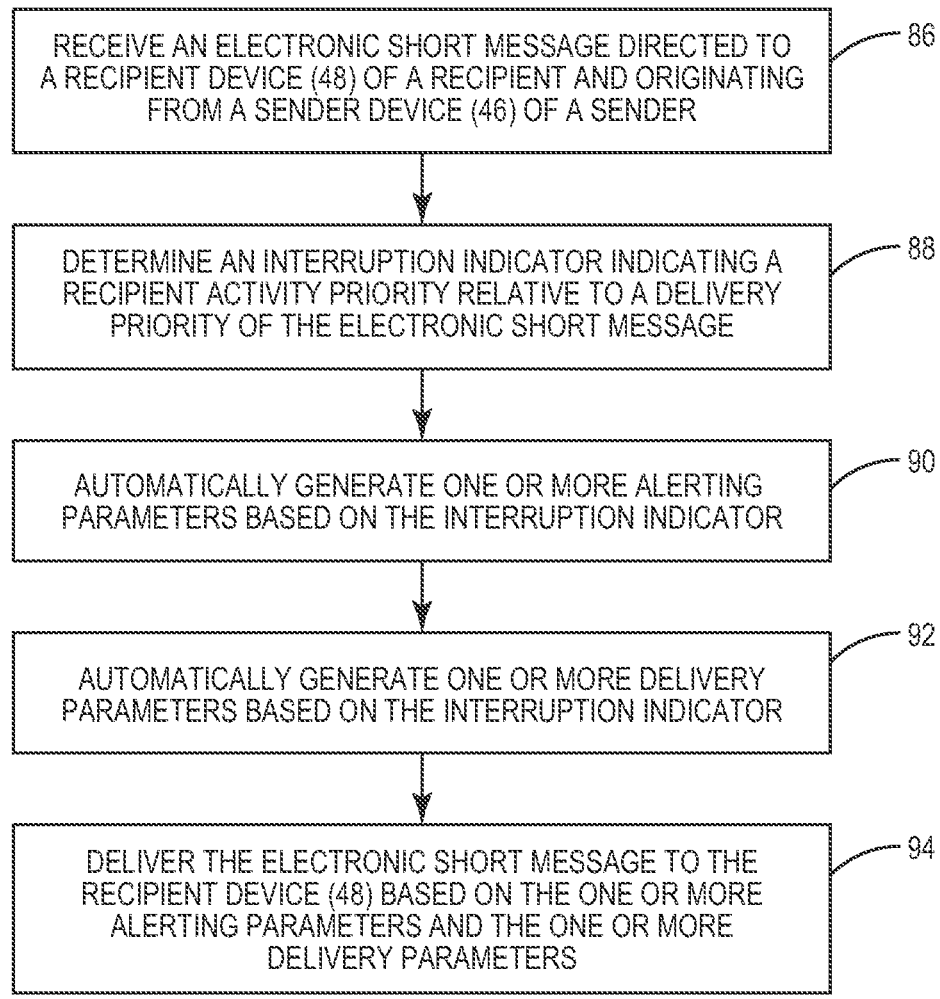
FIG. 4 is a flowchart illustrating exemplary functions for activity-aware intelligent alerting and delivery of electronic short messages.

To generally describe exemplary operations of the intelligent message delivery agent 44 of FIG. 3 for activity-aware intelligent alerting and delivery of electronic short messages, FIG. 4 is provided. In this example, the operations begin with the intelligent message delivery agent 44 receiving an electronic short message directed to a recipient device 48 of a recipient and originating from a sender device 46 of a sender (block 86). The intelligent message delivery agent 44 determines an interruption indicator that indicates a recipient activity priority relative to a delivery priority of the electronic short message (block 88). In some embodiments, the interruption indicator is determined by the interruptibility determination function 62 based on detected indicia such as recipient activity data, a context for the activity of the recipient, a context of the electronic short message itself, and/or optional recipient-specified rules. The interruption indicator may indicate that the recipient activity priority exceeds that of the delivery priority of the electronic short message, and therefore the activity should not be interrupted. Conversely, the interruption indicator may indicate that the delivery priority of the electronic short message exceeds the recipient activity priority, and thus the electronic short message should be immediately alerted and delivered.

The intelligent message delivery agent 44 next automatically generates one or more alerting parameters based on the interruption indicator (block 90). In some embodiments, the one or more alerting parameters may indicate, as non-limiting examples, a priority of an alert, a delivery time of an alert, a type of an alert, a visibility of an alert, an audio indicator to be used for an alert, and/or an audio volume of an alert. It is to be understood that one or more alerting parameters indicating that no alert should accompany delivery is intended to be within the scope of this disclosure. The intelligent message delivery agent 44 also automatically generates one or more delivery parameters based on the interruption indicator (block 92). Some embodiments may provide that the one or more delivery parameters indicate, as non-limiting examples, a delivery priority of the electronic short message, a delivery time of the electronic short message, and/or a delivery format of the electronic short message. Some embodiments may provide that the one or more alerting parameters and the one or more delivery parameters are generated by the parameter generation function 64 of the intelligent message delivery agent 44 based on the interruption indicator.

The intelligent message delivery agent 44 then delivers the electronic short message to the recipient device 48 based on the one or more alerting parameters and the one or more delivery parameters (block 94). According to some embodiments, the electronic short message is delivered to the recipient device 48 by the delivery function 66 of the intelligent message delivery agent 44.

Figure 5A:
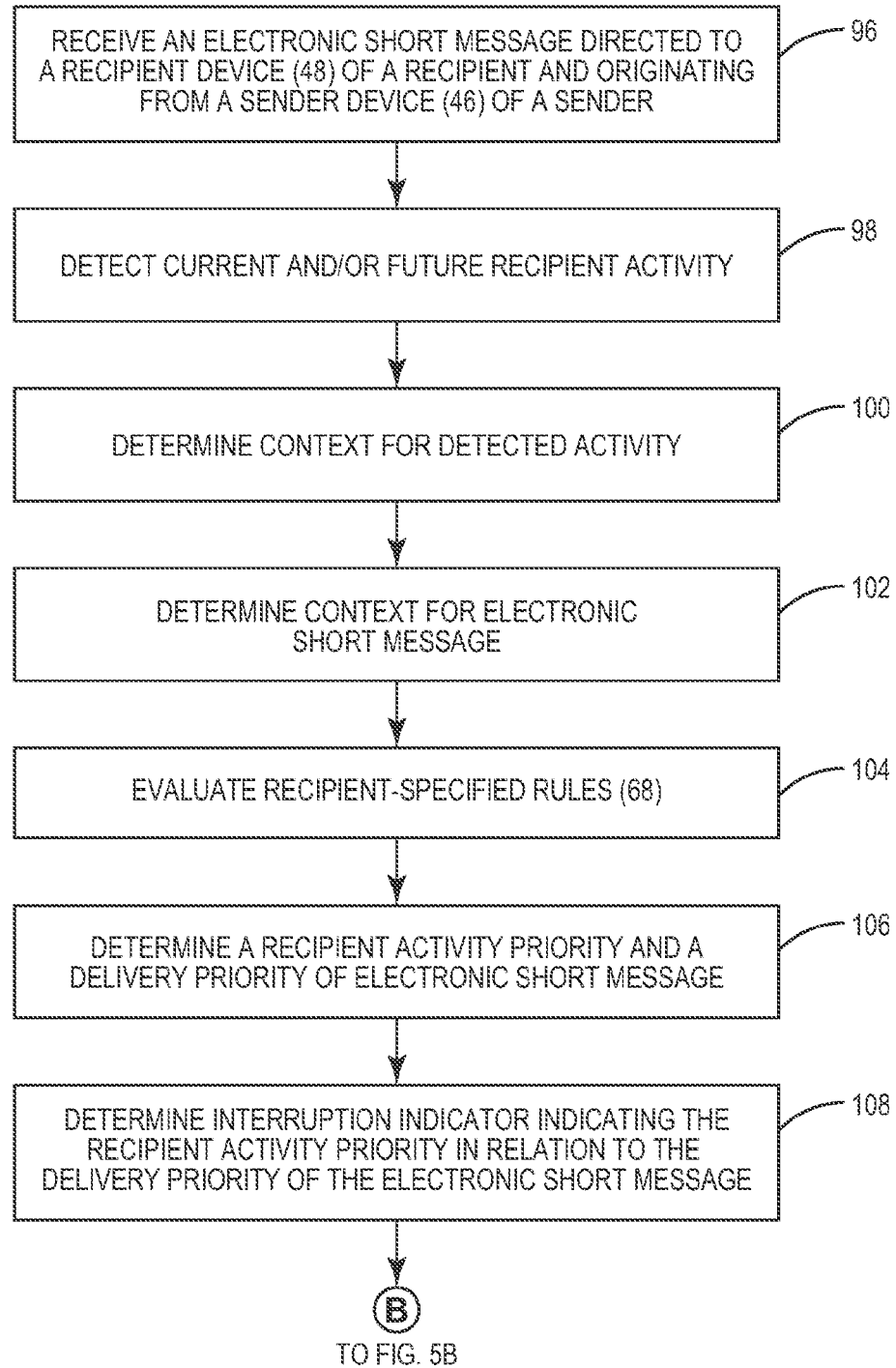
FIGS. 5A and 5B are flowcharts illustrating more detailed exemplary functions for activity-aware intelligent alerting and delivery of electronic short messages based on indicia such as data representing a recipient activity, an activity context, and a message context.
Figure 5B:
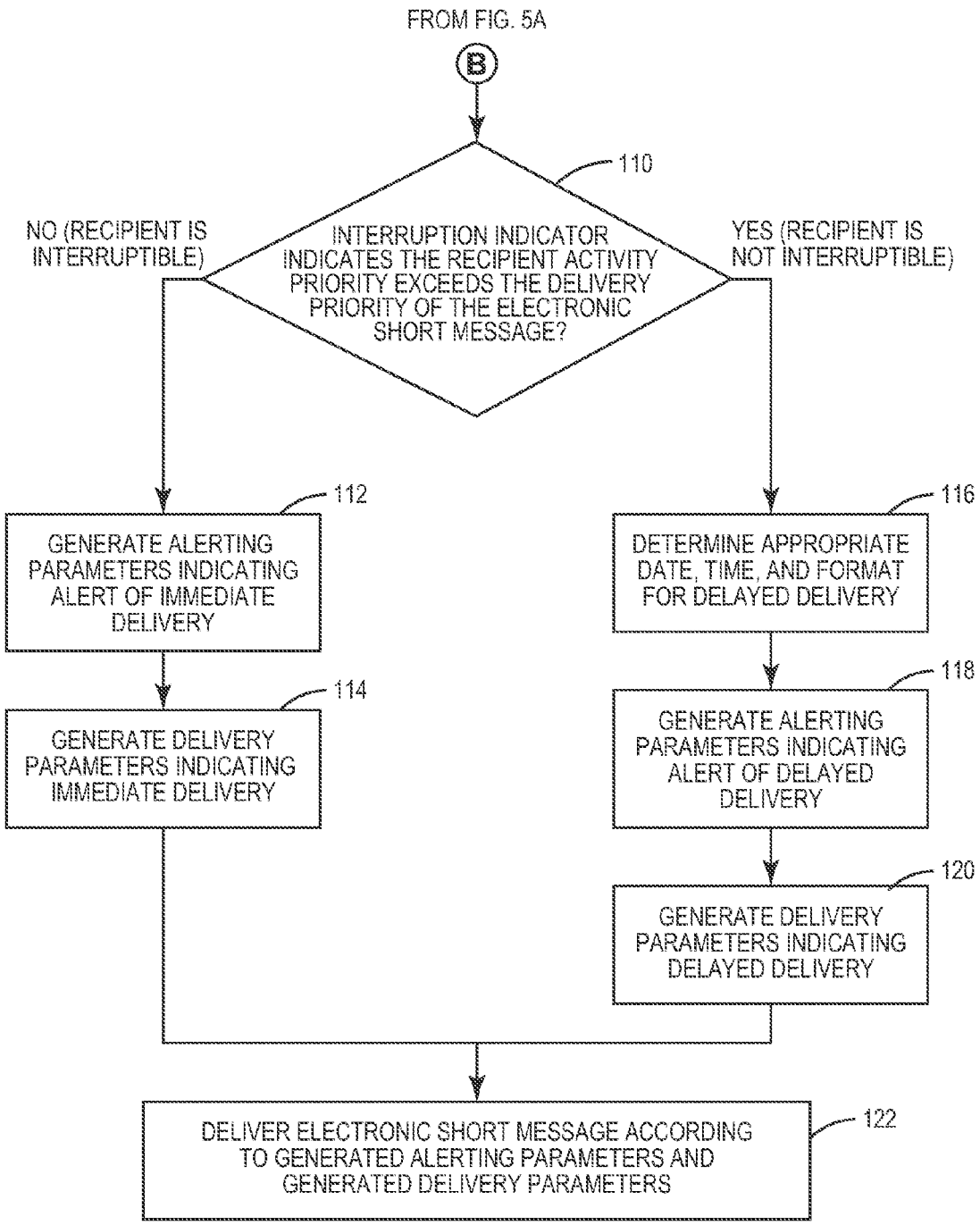

FIGS. 5A and 5B are provided to illustrate in more detail an exemplary generalized process for an intelligent message delivery agent configured to determine an interruption indicator, and to deliver an electronic short message accordingly. FIG. 5A details a process for receiving an electronic short message, evaluating data to determine a recipient activity priority and a delivery priority of the electronic short message, and determining an interruption indicator. FIG. 5B shows operations for alerting and delivering the electronic short message either immediately or with a delay, based on the interruption indicator. For illustrative purposes, FIGS. 5A and 5B refer to elements of the exemplary system 42 and the intelligent message delivery agent 44 of FIG. 3.

Referring now to FIG. 5A, the intelligent message delivery agent 44 receives an electronic short message directed to the recipient device 48 of the recipient and originating from the sender device 46 of the sender (block 96). The intelligent message delivery agent 44 detects indicia of an activity in which the recipient is currently engaged or soon to be engaged (block 98). In some embodiments, indicia representing a recipient's activity may be directly or indirectly inferred based on data obtained by the intelligent message delivery agent 44 from the one or more recipient activity/context data provider(s) 70. For instance, the calendar 76 may provide data regarding scheduled activities for the recipient and information related to other participants taking part in the recipient's scheduled activities.

The intelligent message delivery agent 44 next determines a context for the activity of the recipient (block 100). In some embodiments, the context for the activity of the recipient may be determined based on data obtained by the intelligent message delivery agent 44 from the one or more recipient activity/context data provider(s) 70. By way of non-limiting example, the recipient geolocation data provider 80 and the recipient local date/time provider 82 may provide information regarding the recipient's current location and local time, respectively. In some embodiments, the context for the activity of the recipient may also be determined based on data regarding scheduled activities for the sender obtained from the calendar 76. Some embodiments may provide that the context for the recipient's activity may be detected based on data obtained from the recipient device 48, such as information related to presence, availability, location, device usage, motion sensing, network connectivity, audio detection, and/or image analysis. Those skilled in the art will recognize that other data provider(s) may serve as sources of data useful for determining the context for the activity of the recipient, all of which are intended to be included within the scope of this disclosure.

The intelligent message delivery agent 44 then determines a context for the electronic short message itself (block 102). Some embodiments may provide that the context for the electronic short message may include determining an identity of the sender of the electronic short message. For instance, the intelligent message delivery agent 44 may determine whether the sender is an actual human being, a system acting on behalf of a human originator (e.g., Twitter or Facebook), an application providing application-specific data (for example, a bank alert), or a device (such as a security camera that has sensed motion). Some embodiments may provide that an identity of the sender may be determined by examining the originating address of the electronic short message and/or by examining the contents of the electronic short message.

In some embodiments, the context for the received electronic short message may be determined by the intelligent message delivery agent 44 based on a relationship between the sender and the intended recipient, and/or a history of interactions between the sender and the recipient. Insight into the relationship and interactions between the sender and the recipient may be provided by one of the recipient activity/context data provider(s) 70, such as the context engine 78. According to some embodiments, the intelligent message delivery agent 44 may determine the context for the received electronic short message based on a content of the electronic short message. Awareness of the content of the electronic short message in conjunction with the relationship between the sender and the intended recipient may provide insight into an appropriate priority or urgency level to be accorded to alerting and delivery of the electronic short message by the intelligent message delivery agent 44.

The intelligent message delivery agent 44 next may optionally evaluate recipient-specified rules 68 that indicate recipient preferences with respect to alerting and/or delivery of the electronic short message (block 104). For example, the recipient-specified rules 68 may specify that electronic short messages from a spouse or a supervisor are to be automatically given a higher delivery priority, while electronic short messages sent at night or on a weekend are to be automatically given a lower delivery priority. It is to be understood that, in determining how the electronic short message will be alerted and/or delivered, the intelligent message delivery agent 44 evaluates the recipient-specified rules 68 in conjunction with other indicia as discussed above, such as data representing the activity of the recipient, the context of the recipient's activity, and/or the context for the electronic short message.

The intelligent message delivery agent 44 determines a priority of the detected indicia representing the activity of the recipient and a delivery priority of the electronic short message (block 106). In some embodiments, the recipient activity priority and the delivery priority of the electronic short message may be determined by the interruptibility determination function 62 of the intelligent message delivery agent 44 based on indicia such as data representing an activity of the recipient, the activity context, and the electronic short message context. For example, the interruptibility determination function 62 may assign a weight to each of various potential recipient activities, activity contexts, and/or electronic short message contexts, and may determine the recipient activity priority and the delivery priority based on evaluation of the assigned weights.

The intelligent message delivery agent 44 determines an interruption indicator that indicates the recipient activity priority in relation to the delivery priority of the electronic short message (block 108). If the recipient activity priority exceeds the delivery priority of the electronic short message, the interruption indicator indicates that the recipient may not be interrupted, and delivery of the electronic short message may be delayed. However, if the delivery priority of the electronic short message exceeds the recipient activity priority, then the interruption indicator indicates that the electronic short message may be delivered immediately. In some embodiments, the interruption indicator is determined by the interruptibility determination function 62 of the intelligent message delivery agent 44 based on the determined recipient activity priority and the determined delivery priority of the electronic short message.

Referring now to FIG. 5B, the intelligent message delivery agent 44 determines whether the interruption indicator indicates that the recipient activity priority exceeds the delivery priority of the electronic short message (block 110). If not (i.e., if the activity of the recipient may be interrupted), the intelligent message delivery agent 44 generates one or more alerting parameters indicating an alert associated with an immediate delivery of the electronic short message (block 112). For example, the one or more alerting parameters may specify that an audible alert should accompany delivery of the electronic short message, and that the audible alert should be played at a high volume. The intelligent message delivery agent 44 next generates one or more delivery parameters indicating an immediate delivery of the electronic short message (block 114).

If the intelligent message delivery agent 44 ascertains at decision block 110 of FIG. 5B that the recipient activity priority exceeds the delivery priority of the electronic short message, the intelligent message delivery agent 44 determines an appropriate date, time, and format for a delayed delivery of the electronic short message (block 116). Some embodiments may provide that an appropriate date and time for a delayed delivery of the electronic short message may be determined based upon an evaluation of data received from a calendar, such as the calendar 76. As a non-limiting example, the intelligent message delivery agent 44 may consider an activity in which the recipient is soon to be engaged, and may deliver the electronic short message at a time where the context of the electronic short message is determined to be more consistent with the context of the activity of the recipient. In some embodiments, the intelligent message delivery agent 44 may determine that the electronic short message is to be delivered in a second format that is different from a first format in which the electronic short message was received. For example, the electronic short message may be received by the intelligent message delivery agent 44 as an SMS message, but may be delivered as an email. Some embodiments may provide that the intelligent message delivery agent 44 may compile multiple electronic short messages into a single digest message for delayed delivery.

Based upon the determined date, time, and format for the delayed delivery of the electronic short message, the intelligent message delivery agent 44 generates one or more alerting parameters indicating an alert associated with a delayed delivery of the electronic short message (block 118). For example, the one or more alerting parameters may specify that a silent alert, such as a vibration, should accompany a delayed delivery of the electronic short message. The intelligent message delivery agent 44 also generates one or more delivery parameters indicating a delayed delivery of the electronic short message (block 120). The one or more delivery parameters may specify the date, time, and format for the electronic short message.

In some embodiments, the one or more alerting parameters and the one or more delivery parameters may be generated by the parameter generation function 64 of the intelligent message delivery agent 44. Some embodiments may provide that generation of the one or more alerting parameters and the one or more delivery parameters may be based in part on one or more recipient-specified rules, such as the recipient-specified rules 68 of the intelligent message delivery agent 44.

Once the one or more alerting parameters and the one or more delivery parameters are generated, the intelligent message delivery agent 44 delivers the electronic short message to the recipient device 48 according to the generated alerting parameters and the generated delivery parameters (block 122). In some embodiments, delivery of the electronic short message is carried out by the delivery function 66 of the intelligent message delivery agent 44.

Figure 6A:
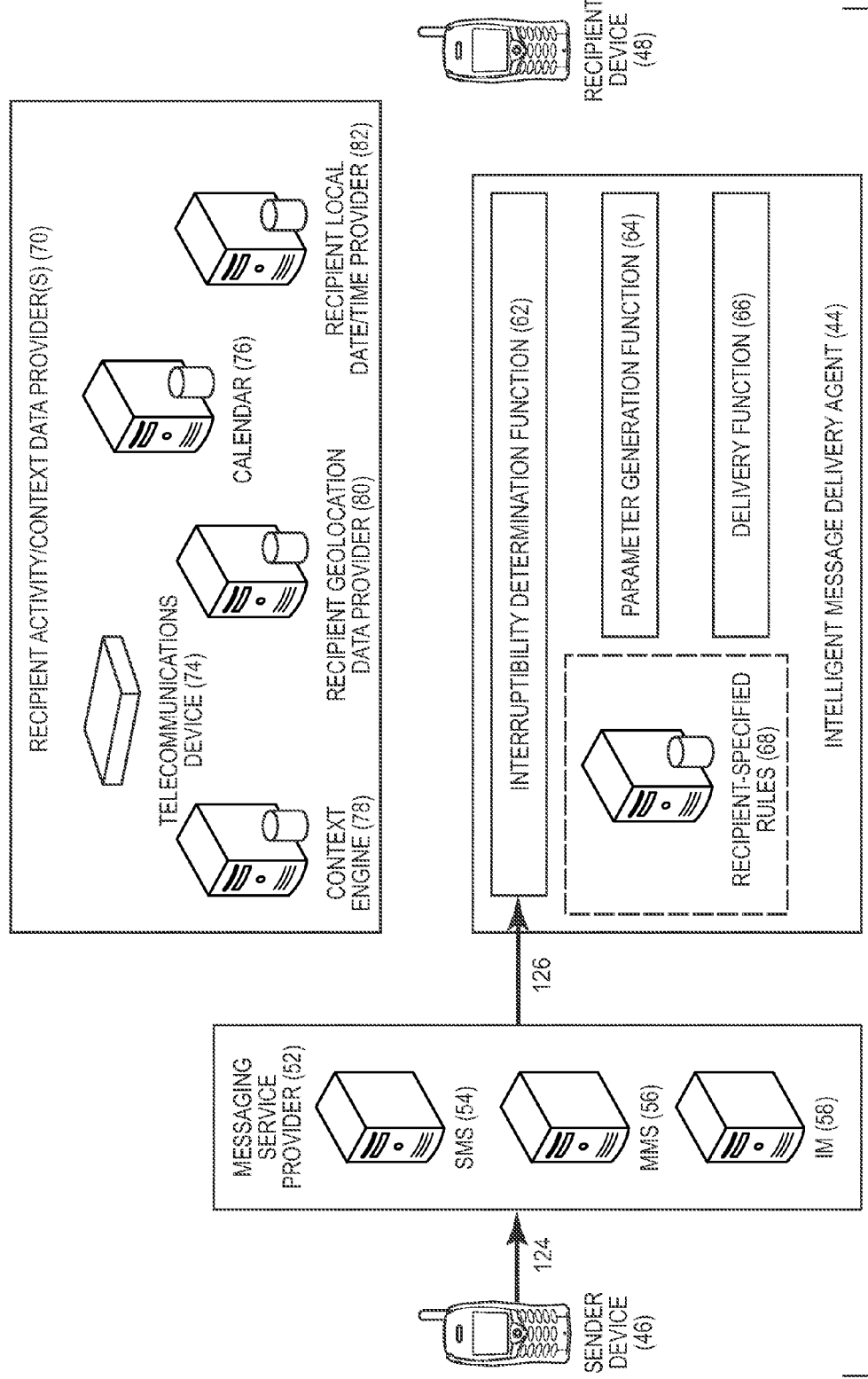
FIGS. 6A-6C are block diagrams illustrating exemplary communications flows within an exemplary system including an intelligent message delivery agent configured to provide activity-aware alerting and delivery of electronic short messages.
Figure 6B:
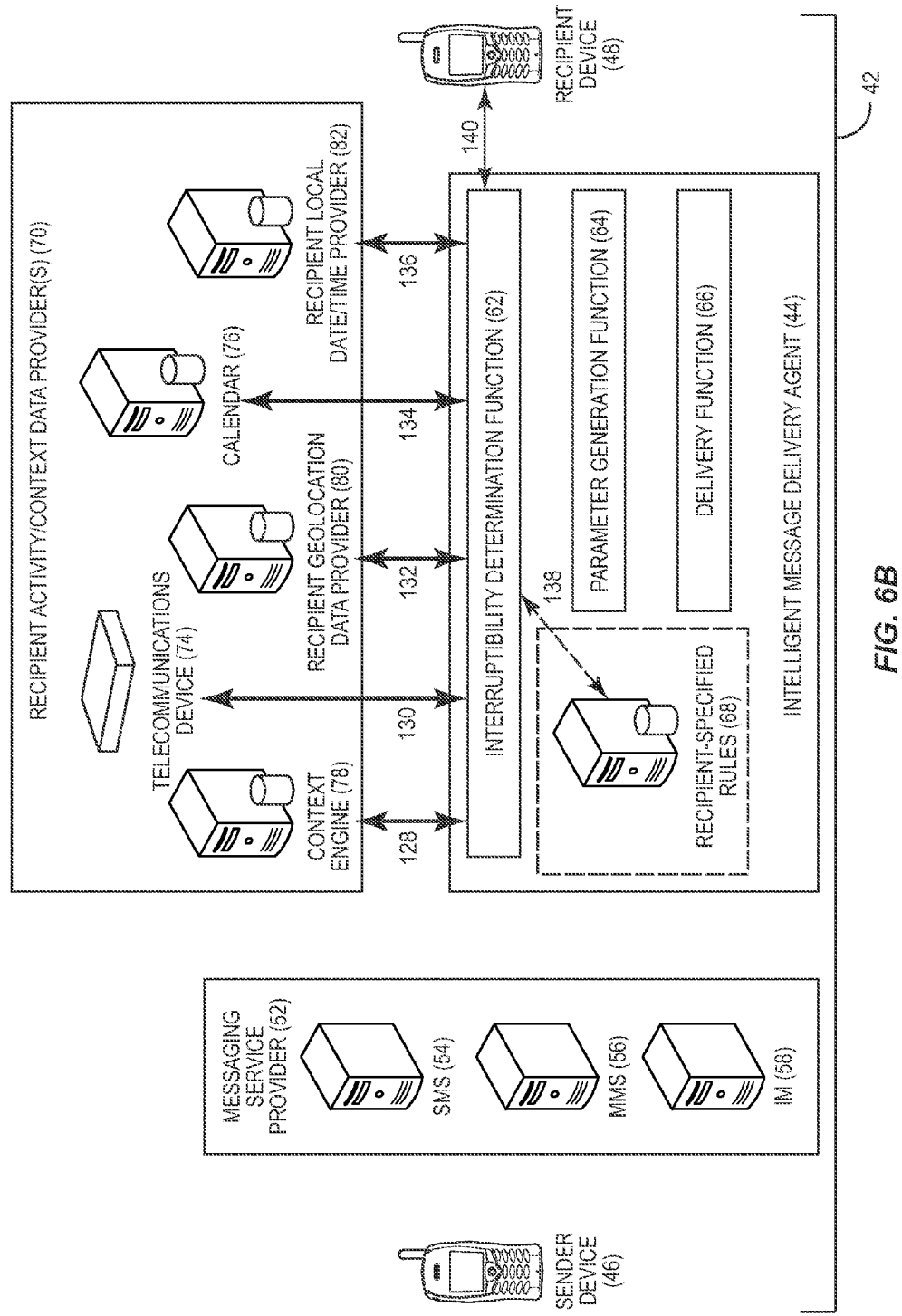
Figure 6C:
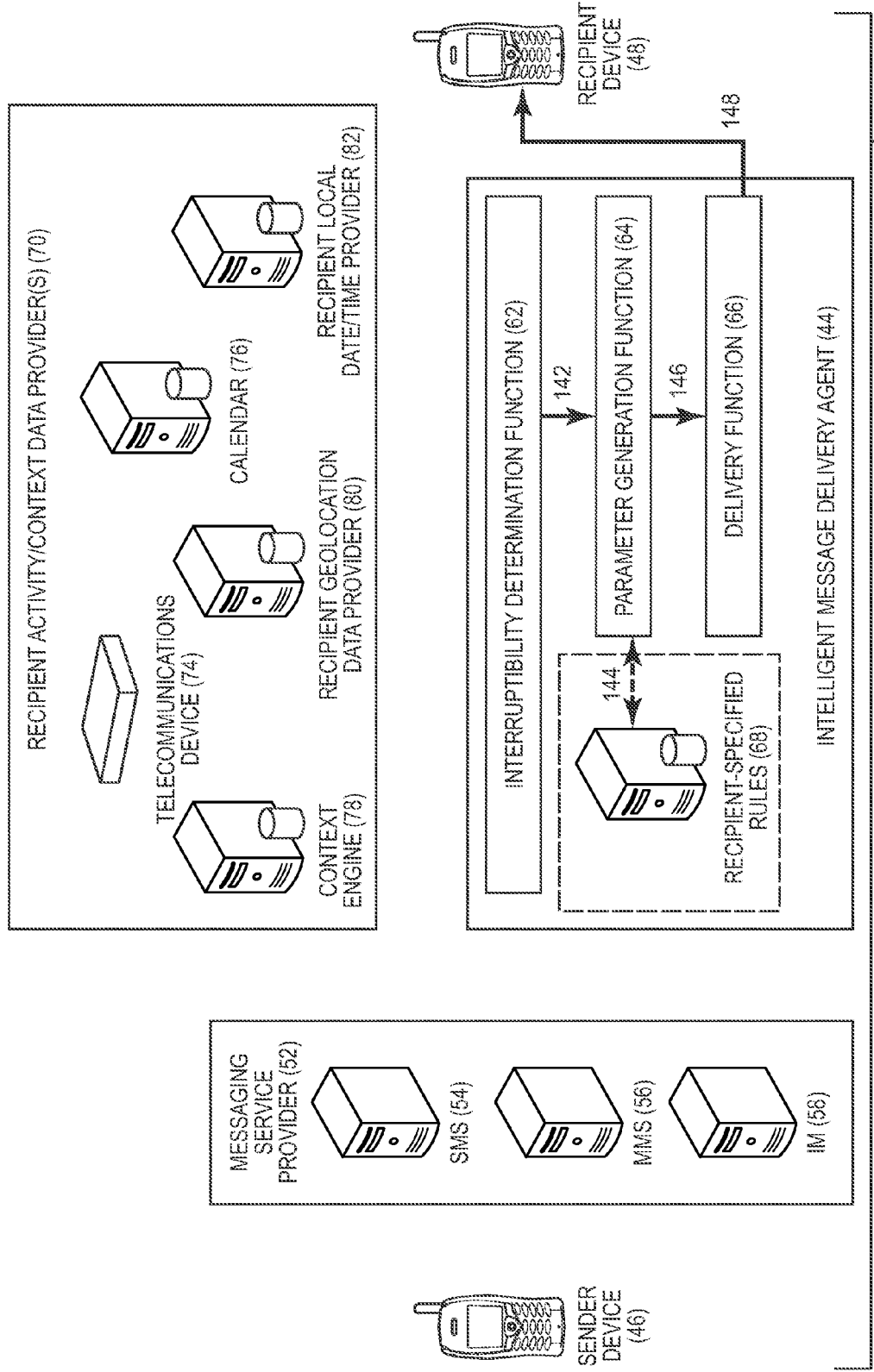

To illustrate exemplary communications flows within an exemplary system 42 including an intelligent message delivery agent 44 configured to provide activity-aware intelligent alerting and delivery of electronic short messages, FIGS. 6A-6C are provided. For illustrative purposes, FIGS. 6A-6C refer to elements of the exemplary system 42 and the intelligent message delivery agent 44 of FIG. 3. Referring now to FIG. 6A, the sender device 46 transmits an electronic short message directed to the recipient device 48 to the messaging service provider 52, as indicated by arrow 124. As noted above, the messaging service provider 52 may include an SMS service provider 54, an MMS service provider 56, and/or an IM service provider 58. As indicated by arrow 126, the messaging service provider 52 then transmits the electronic short message to the intelligent message delivery agent 44, where it is received and processed by the interruptibility determination function 62.

As shown in FIG. 6B, the interruptibility determination function 62 of the intelligent message delivery agent 44 exchanges data with one or more recipient activity/context data providers 70. The data received by the interruptibility determination function 62 from the recipient activity/context data providers 70 may be relevant to a current or future activity of the recipient, a context for the recipient's activity, and/or a context for the electronic short message. For example, in some embodiments, the context engine 78 may provide data regarding a relationship between the sender and the intended recipient, and/or a history of interactions between the sender and the intended recipient, as indicated by arrow 128. The telecommunications device 74 may comprise, as non-limiting examples, a telecommunications bridge, a media server, a communications client, a dedicated communications device, and/or a smartphone. The telecommunications device 74 may indicate whether the sender and the intended recipient are currently engaged in a teleconference, or may provide historical data regarding interactions between the sender and the intended recipient, as indicated by arrow 130. Some embodiments may provide that the recipient's location and/or motion may be provided by the recipient geolocation data provider 80, as illustrated by arrow 132. Information related to activities in which the recipient and/or the sender is currently engaged or soon will be engaged may be provided by the calendar 76, as indicated by arrow 134. The local date and time for the recipient may be provided by the recipient local date/time provider 82, as shown by arrow 136.

In some embodiments, the interruptibility determination function 62 of the intelligent message delivery agent 44 may optionally receive recipient-specified rules 68 indicating the recipient's preferences, as represented by arrow 138. The recipient-specified rules 68 may provide insight into interruption preferences set by the recipient. In some embodiments, the interruptibility determination function 62 of the intelligent message delivery agent 44 may further receive data from the recipient device 48, as indicated by arrow 140. For example, the interruptibility determination function 62 may receive data related to usage of the recipient device 48, usage of a messaging client or other software applications, network connectivity, motion sensing, and/or audio/image/video input from the recipient device 48.

The communications flow then continues as illustrated in FIG. 6C. As discussed above with respect to FIGS. 5A and 5B, the interruptibility determination function 62 of the intelligent message delivery agent 44 determines an interruption indicator based on a recipient activity priority and a delivery priority of the electronic short message. The interruptibility determination function 62 then transmits the interruption indicator to the parameter generation function 64, as indicated by arrow 142. In some embodiments, the parameter generation function 64 may optionally receive the recipient-specified rules 68 indicating recipient preferences regarding alerting and delivery of electronic short messages, as represented by arrow 144. The parameter generation function 64 generates one or more alert parameters and one or more delivery parameters based on the interruption indicator, and optionally on the recipient-specified rules 68. The parameter generation function 64 then transmits the one or more alert preferences and the one or more delivery parameters to the delivery function 66 of the intelligent message delivery agent 44, as shown by the arrow 146. The delivery function 66 delivers the electronic short message to the recipient device 48 based on the one or more alert preferences and the one or more delivery preferences, as indicated by arrow 148.

Figure 7:
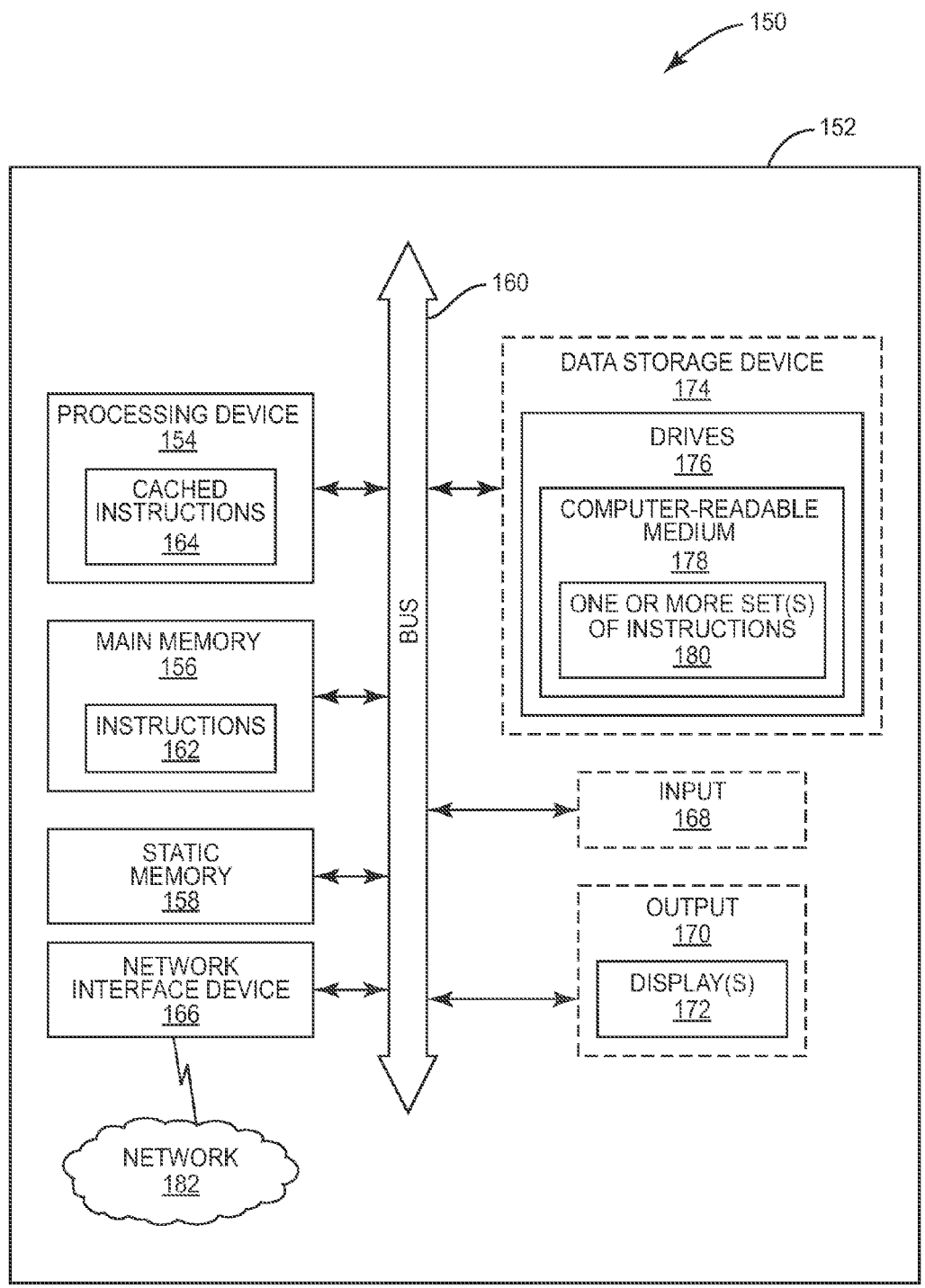
FIG. 7 is a block diagram of an exemplary processor-based system that may include the activity-aware alerting and delivery systems of FIGS. 2 and 5A-5C.

FIG. 7 provides a schematic diagram representation of a delivery system 150 in the form of an exemplary computer system 152 adapted to execute instructions from an exemplary computer-readable medium to perform the functions described herein. In some embodiments, the delivery system 150 may execute instructions to perform the functions of the intelligent message delivery agent 44 of the preceding figures. In this regard, the delivery system 150 may comprise the computer system 152, within which a set of instructions for causing the delivery system 150 to perform any one or more of the methodologies discussed herein may be executed. The delivery system 150 may be connected (as a non-limiting example, networked) to other machines in a local area network (LAN), an intranet, an extranet, or the Internet. The delivery system 150 may operate in a client-server network environment, or as a peer machine in a peer-to-peer (or distributed) network environment. While only a single delivery system 150 is illustrated, the terms "controller" and "server" shall also be taken to include any collection of machines that individually or jointly execute a set (or multiple sets) of instructions to perform any one or more of the methodologies discussed herein. The delivery system 150 may be a server, a personal computer, a desktop computer, a laptop computer, a personal digital assistant (PDA), a computing pad, a mobile device, or any other device and may represent, as non-limiting examples, a server or a user's computer.

The exemplary computer system 152 includes a processing device or processor 154, a main memory 156 (as non-limiting examples, read-only memory (ROM), flash memory, dynamic random access memory (DRAM), such as synchronous DRAM (SDRAM), etc.), and a static memory 158 (as non-limiting examples, flash memory, static random access memory (SRAM), etc.), which may communicate with each other via a bus 160. Alternatively, the processing device 154 may be connected to the main memory 156 and/or the static memory 158 directly or via some other connectivity means.

The processing device 154 represents one or more processing devices, such as a microprocessor, central processing unit, or the like. More particularly, the processing device 154 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 154 is configured to execute processing logic in instructions 162 and/or cached instructions 164 for performing the operations and steps discussed herein.

The computer system 152 may further include a communications interface in the form of a network interface device 166. It also may or may not include an input 168 to receive input and selections to be communicated to the computer system 152 when executing instructions. It also may or may not include an output 170, including but not limited to display(s) 172. The display(s) 172 may be a video display unit (as non-limiting examples, a liquid crystal display (LCD) or a cathode ray tube (CRT)), an alphanumeric input device (as a non-limiting example, a keyboard), a cursor control device (as a non-limiting example, a mouse), and/or a touch screen device (as a non-limiting example, a tablet input device or screen).

The computer system 152 may or may not include a data storage device 174 that includes using drive(s) 176 to store the functions described herein in a computer-readable medium 178, on which is stored one or more sets of instructions 180 (e.g., software) embodying any one or more of the methodologies or functions described herein. The functions can include the methods and/or other functions of the delivery system 150, a participant user device, and/or a licensing server, as non-limiting examples. The instructions 180 may also reside, completely or at least partially, within the main memory 156 and/or within the processing device 154 during execution thereof by the computer system 152, the main memory 156 and the processing device 154 also constituting machine-accessible storage media. The instructions 162, the cached instructions 164, and/or the one or more sets of instructions 180 may further be transmitted or received over a network 182 via the network interface device 166. The network 182 may be an intra-network or an inter-network.

While the computer-readable medium 178 is shown in an exemplary embodiment to be a single medium, the term "machine-accessible storage medium" should be taken to include a single medium or multiple media (as non-limiting examples, a centralized or distributed database, and/or associated caches and servers) that store one or more sets of instructions. The term "machine-accessible storage medium" shall also be taken to include any medium that is capable of storing, encoding, or carrying a set of instructions for execution by the machine, and that cause the machine to perform any one or more of the methodologies disclosed herein. The term "machine-accessible storage medium" shall accordingly be taken to include, but not be limited to, solid-state memories, optical and magnetic media, and carrier wave signals.

As also depicted in FIG. 7, a licensing server 150, a participant user device 150, a web server 150, a virtualization server 150, an application server 150, a storage device 150, and/or an accounting server 150 may each also be provided in the form of the exemplary computer system 152.

Processor systems for enterprise communications and collaboration based on WebRTC/HTML5, and related methods, apparatuses, and computer-readable media according to the embodiments disclosed herein may be provided in or integrated into any processor-based device. Examples, without limitation, include a set top box, an entertainment unit, a navigation device, a communications device, a fixed location data unit, a mobile location data unit, a mobile phone, a cellular phone, an Internet phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The arbiters, master devices, and slave devices described herein may be employed in any circuit, hardware component, integrated circuit (IC), or IC chip, as non-limiting examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a processor, a digital signal processor (DSP), an Application Specific Integrated Circuit (ASIC), an field programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, as non-limiting examples, a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, as non-limiting examples, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. As non-limiting examples, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for providing intelligent alerting and delivery of an electronic short message, comprising:
   receiving, by a computing device, an electronic short message directed to a recipient device of a recipient and originating from a sender device of a sender;
   automatically detecting a delivery indicium, the delivery indicium representing a message context for the electronic short message;
   automatically determining a delivery priority for the electronic short message based on the delivery indicium;
   automatically detecting an activity indicium, the activity indicium representing an activity context for a current activity of the recipient;
   automatically determining a recipient activity priority for the electronic short message based on the activity indicium;
   automatically determining, by the computing device, an interruption indicator based on the recipient activity priority, the delivery priority, and a recipient rule, the interruption indicator indicating a relationship between the recipient activity priority and the delivery priority of the electronic short message;
   in response to the interruption indicator indicating that the recipient activity priority of the electronic short message exceeds the delivery priority, generating a delivery parameter that indicates a date, time, and format for delayed delivery of the electronic short message and an alerting parameter based on the delivery parameter that indicates an alert associated with a delayed delivery of the electronic short message;
   in response to the interruption indicator indicating that the delivery priority of the electronic short message exceeds the recipient activity priority, generating a delivery parameter that indicates an immediate delivery of the electronic short message and an alerting parameter that indicates an alert associated with an immediate delivery of the electronic short message;
   delivering the electronic short message to the recipient device based on the generated alerting parameter and the delivery parameter.

2. The method of claim 1 wherein automatically determining the interruption indicator is based on at least one of the group consisting of: a scheduled activity of the recipient, an availability of the recipient, a scheduled activity of the sender, a relationship between the recipient and the sender, an interaction history between the recipient and the sender, a content of the electronic short message, a location for the recipient, a local date for the recipient, and a local time for the recipient.

3. The method of claim 1 wherein the alerting parameter comprises at least one of the group consisting of: an indication of a priority of an alert, a delivery time of the alert, a type of the alert, a visibility of the alert, an audio indicator to be used for the alert, and an audio volume of the alert.

4. The method of claim 1 wherein the recipient rule is a recipient-specified alerting rule.

5. The method of claim 1, wherein the electronic short message comprises at least one of the group consisting of: a Short Message Service (SMS) message, a Multimedia Messaging Service (MMS) message, and an Instant Messaging (IM) message.

6. A system for providing intelligent alerting and delivery of an electronic short message, comprising:
   at least one communications interface;
   an intelligent message delivery agent associated with the at least one communications interface, the intelligent message delivery agent configured to:
      receive an electronic short message directed to a recipient device of a recipient and originating from a sender device of a sender;
      automatically detect a delivery indicium, the delivery indicium representing a message context for the electronic short message;
      automatically determine a delivery priority for the electronic short message based on the delivery indicium;
      automatically detect an activity indicium, the activity indicium representing an activity context for a current activity of the recipient;
      automatically determine a recipient activity priority for the electronic short message based on the activity indicium;
      automatically determine an interruption indicator based on the recipient activity priority, the delivery priority, and a recipient rule, the interruption indicator indicating a relationship between the recipient activity priority and the delivery priority of the electronic short message;
      in response to the interruption indicator indicating that the recipient activity priority of the electronic short message exceeds the delivery priority, generating a delivery parameter that indicates a date, time, and format for delayed delivery of the electronic short message and an alerting parameter based on the delivery parameter that indicates an alert associated with a delayed delivery of the electronic short message;
      in response to the interruption indicator indicating that the delivery priority of the electronic short message exceeds the recipient activity priority, generating a delivery parameter that indicates an immediate delivery of the electronic short message and an alerting parameter that indicates an alert associated with an immediate delivery of the electronic short message;
      deliver the electronic short message to the recipient device based on the alerting parameter and the delivery parameter.

7. The system of claim 6 wherein the intelligent message delivery agent is configured to automatically determine the interruption indicator based on at least one of the group consisting of: a scheduled activity of the recipient, an availability of the recipient, a scheduled activity of the sender, a relationship between the recipient and the sender, an interaction history between the recipient and the sender, a content of the electronic short message, a location for the recipient, a local date for the recipient, and a local time for the recipient.

8. The system of claim 6 wherein the alerting parameter comprises at least one of the group consisting of: an indication of a priority of an alert, a delivery time of the alert, a type of the alert, a visibility of the alert, an audio indicator to be used for the alert, and an audio volume of the alert.

9. A non-transitory computer-readable medium having stored thereon computer-executable instructions to cause a processor to implement a method comprising:
- receiving, by a computing device, an electronic short message directed to a recipient device of a recipient and originating from a sender device of a sender;
- automatically detecting a delivery indicium, the delivery indicium representing a message context for the electronic short message;
- automatically determining a delivery priority for the electronic short message based on the delivery indicium;
- automatically detecting an activity indicium, the activity indicium representing an activity context for a current activity of the recipient;
- automatically determining a recipient activity priority for the electronic short message based on the activity indicium;
- automatically determining, by the computing device, an interruption indicator based on the recipient activity priority, the delivery priority, and a recipient rule, the interruption indicator indicating a relationship between the recipient activity priority and the delivery priority of the electronic short message;
- in response to the interruption indicator indicating that the recipient activity priority of the electronic short message exceeds the delivery priority, generating a delivery parameter that indicates a date, time, and format for delayed delivery of the electronic short message and an alerting parameter based on the delivery parameter that indicates an alert associated with a delayed delivery of the electronic short message;
- in response to the interruption indicator indicating that the delivery priority of the electronic short message exceeds the recipient activity priority, generating a delivery parameter that indicates an immediate delivery of the electronic short message and an alerting parameter that indicates an alert associated with an immediate delivery of the electronic short message;
- delivering the electronic short message to the recipient device based on the generated alerting parameter and the delivery parameter.

10. The non-transitory computer-readable medium of claim 9 having stored thereon the computer-executable instructions to cause the processor to implement the method wherein automatically determining the interruption indicator is based on at least one of the group consisting of: a scheduled activity of the recipient, an availability of the recipient, a scheduled activity of the sender, a relationship between the recipient and the sender, an interaction history between the recipient and the sender, a content of the electronic short message, a location for the recipient, a local date for the recipient, and a local time for the recipient.

11. The non-transitory computer-readable medium of claim 9 having stored thereon the computer-executable instructions to cause the processor to implement the method wherein the alerting parameter comprises at least one of the group consisting of: an indication of a priority of an alert, a delivery time of the alert, a type of the alert, a visibility of the alert, an audio indicator to be used for the alert, and an audio volume of the alert.

12. The method of claim 1 wherein the alerting parameter indicates a delayed alert at a first time in response to the interruption indicator, and
wherein the delivery parameter indicates a delivery of the electronic short message at a second time after the first time in response to the interruption indicator.

* * * * *